United States Patent [19]

Borsuk

[11] Patent Number: 4,718,928
[45] Date of Patent: Jan. 12, 1988

[54] QUICK ACCESS CONTACT MOUNTING FIXTURE

[75] Inventor: Leslie M. Borsuk, Los Alamitos, Calif.

[73] Assignee: ITT Corporation, New York, N.Y.

[21] Appl. No.: 2,885

[22] Filed: Jan. 13, 1987

[51] Int. Cl.⁴ .......................... C03B 23/09; G02B 5/14
[52] U.S. Cl. .......................................... 65/2; 65/11.1; 65/37; 65/40; 65/268; 219/121 EG; 219/121 ES; 219/121 EX; 264/2.7; 248/516; 403/327
[58] Field of Search ...................... 65/2, 10.2, 11.1, 37, 65/40, 280, 268; 264/1.4, 2.7; 350/96.18; 373/2, 3, 4, 22, 23, 24; 219/121 EB, 121 EF, 121 EG, 121 ER, 121 ES, 121 ET, 121 EX; 248/516; 211/89; 403/327

[56] References Cited

U.S. PATENT DOCUMENTS

| 1,621,811 | 3/1927 | Richard et al. | 403/327 X |
| 2,736,562 | 2/1956 | Blackburn | 403/327 X |
| 2,876,597 | 3/1959 | Simer | 65/285 X |
| 3,176,998 | 4/1965 | Parker | 403/327 X |
| 4,243,399 | 1/1981 | Khoe et al. | 65/37 X |
| 4,345,936 | 8/1982 | Basola et al. | 264/2.7 |
| 4,675,043 | 6/1987 | Conta et al. | 65/29 X |

FOREIGN PATENT DOCUMENTS

| 59-7303 | 1/1984 | Japan | 65/10.2 |
| 60-164705 | 8/1985 | Japan | 65/10.2 |

*Primary Examiner*—Robert L. Lindsay
*Attorney, Agent, or Firm*—T. L. Peterson

[57] ABSTRACT

A fixture is provided which enables the rapid mounting of an optical fiber contact with its forward end at a predetermined position and orientation with respect to arc-creating electrodes. The fixture includes a frame with a vertical slot having a width greater than the diameter of the cylindrical contact, and a plurality of spring-biased plungers which enable the contact to be pushed sidewardly into the slot and which thereafter press the contact against the slot bottom. The contact can slide vertically along the slot and plungers until a stop on the contact abuts a corresponding stop on the fixture and an orienting pin on the fixture passes into a corresponding hole in the contact stop.

9 Claims, 6 Drawing Figures

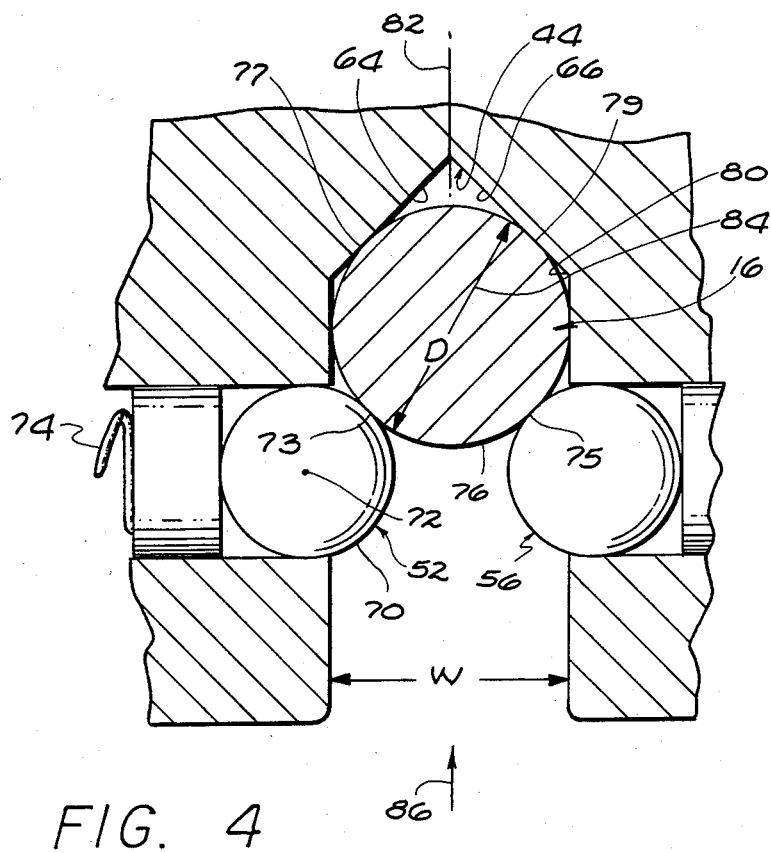
FIG. 4
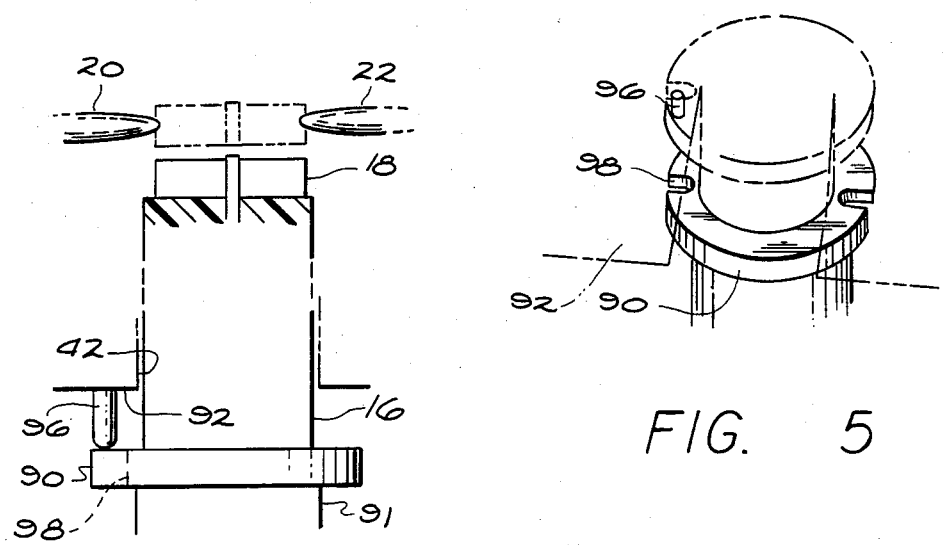
FIG. 5
FIG. 6

4,718,928

QUICK ACCESS CONTACT MOUNTING FIXTURE

BACKGROUND OF THE INVENTION

One approach for coupling a pair of optical fibers involves mounting each fiber in a corresponding contact and melting the ends of the fibers to form them into lenses. The contacts are placed with their front ends abutting and the lenses slightly spaced and in alignment, to efficiently pass light from one fiber to the other. The melting of the optic fiber end can be accomplished by forming a cross-aperture near the front of the contact where an end portion of the fiber lies, and passing an electric arc through the cross-aperture, between a pair of electrodes. For rapid installation of the contact in the lens-forming equipment, it is necessary to provide a means for accurately locating the cylindrical contact along a predetermined vertical axis, and with the tip at a predetermined height relative to the electrodes.

One approach applicant has previously used is to form a vertical hole in a fixture, through which the contact can be inserted, with an O-ring along the hole that provides friction for gripping the contact to prevent it from falling. The need to insert the contact along its length through the O-ring is somewhat cumbersome, and does not result in highly precise holding of the contact. A fixture which facilitated the mounting of a contact, in a manner that allowed substantially the entire contact to remain visible throughout its mounting and permitted rapid mounting and removal, while permitting holding of the contact precisely in a predetermined position and orientation, would be of considerable value.

SUMMARY OF THE INVENTION

In accordance with one embodiment of the present invention, a fixture is provided for holding an optical fiber connector contact, which enables rapid and accurate mounting of the contact and its removal. The fixture includes a frame with a vertical slot which receives the contact, and a plurality of plungers which bias the contact against the bottom of the slot. The contact can pass horizontally into the slot and vertically along the slot and plungers until the contact is positioned at a predetermined height. The frame and contact form key and key receiver parts which mate to allow the contact to be pushed to its desired height, only when the contact is in a predetermined orientation about a vertical axis.

The novel features of the invention are set forth with particularity in the appended claims. The invention will be best understood from the following description when read in conjunction with the accompanying drawings.

BRIEF DESCRIPTION OF THE DRAWINGS

FIG. 4 is a partial view taken on the line 4—4 of FIG. 1.

FIG. 5 is a perspective view of a portion of the fixture and contact of FIG. 1, showing them prior to full installation of the contact on the fixture.

FIG. 6 is a partial front view of the fixture and contact of FIG. 5.

DESCRIPTION OF THE PREFERRED EMBODIMENTS

Figure 1:
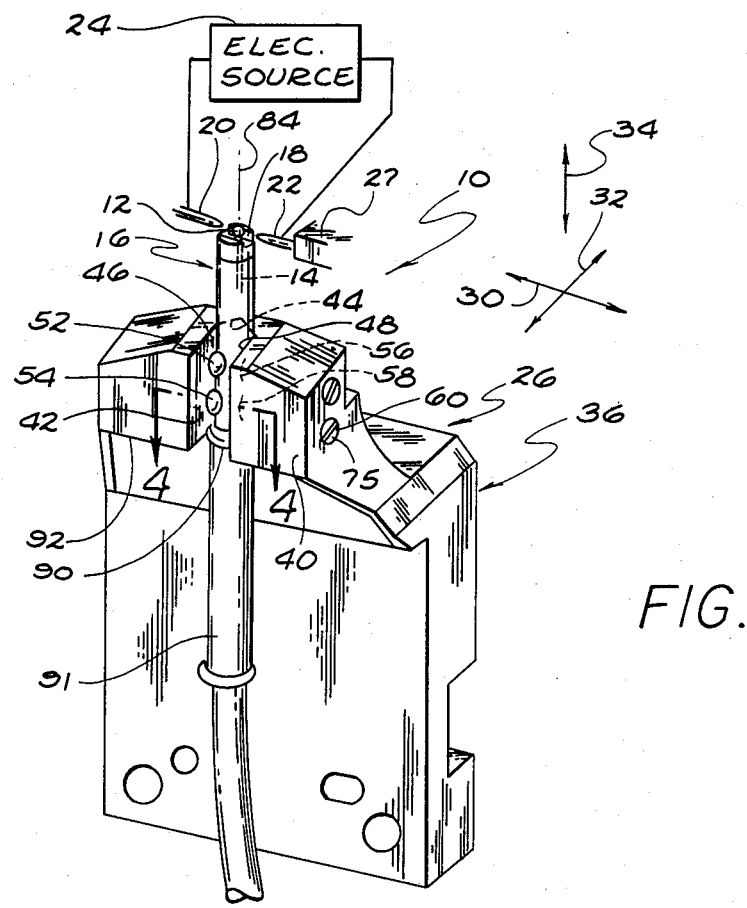
FIG. 1 is a perspective view of a fixture constructed in accordance with the present invention, showing it holding a contact positioned relative to electrodes.

FIG. 1 illustrates an apparatus 10 for forming a lens 12 at an end of an optical fiber 14 while the fiber lies in a contact 16. The lens can be formed by fixing the optic fiber in the contact with an end portion of the lens lying in a cross-aperture 18 of the contact, and positioning the contact so that a pair of electrodes 20, 22 lie at opposite sides of the cross-aperture. When a voltage is applied from a source 24 between the electrodes, an electric arc is created which passes across the fiber end portion to melt it and form it into the lens. The contact is mountable on a fixture 26, and the electrodes are held by mounts 27 at predetermined locations above the top of a slot 42 in the fixture. Inasmuch as the optic fiber has a small diameter such as 0.005 inch and the electrodes must be accurately positioned with respect to the optic fiber end, it is important that the fixture be able to hold the contact precisely along horizontal direction 30, 32 as well as along a vertical direction 34. It is also desirable that the contact be capable of being rapidly and easily installed on the fixture at the desired position, and be rapidly removable therefrom.

The fixture 26 includes a frame 36 which has a front 40 and a slot 42 extending into the front. The slot has a vertically extending slot bottom 44 and a pair of slot sides 46, 48. Four plungers 52–58 lie in plunger holes 60 formed in the frame and press the contact against the slot bottom 44.

As shown in FIG. 4, the slot bottom 44 is substantially V-shaped, with a pair of bottom walls 64, 66. The contact 16 is of substantially cylindrical shape, at least at the portion lying in the slot, with a diameter D greater than the width W of the slot, to leave sufficient clearance for the contact to be easily moved horizontally into the slot and then slid vertically along the slot. Each plunger such as 52 includes a ball 70 that is free to rotate about any axis bearing through its center 72. A spring 74 (backed by a screw 75, FIG. 1) resiliently urges the ball into the slot. The balls of the two plungers 52, 56 press against locations 73, 75 at a forward side 76 of the contact which is opposite the rearward side 78 that bears at locations 77, 79 against the slot bottom. The bottom walls 64, 66 of the slot extend at equal angles from a center line 82 of the slot along lines that meet on the center line. As a result, the cylindrical contact portion lying in a slot is always positioned with its axis 84 at the same location.

Figure 2:
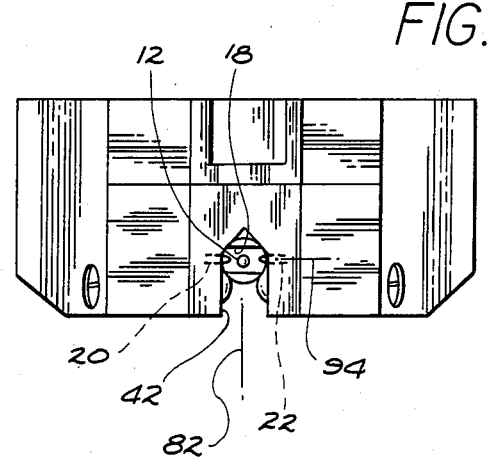
FIG. 2 is a plan view of the fixture and contact of FIG. 1.
Figure 3:
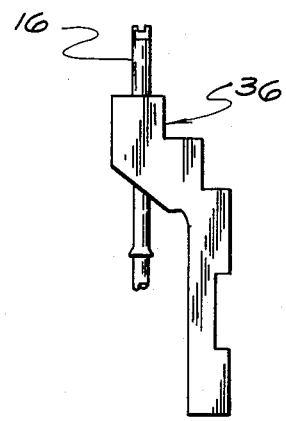
FIG. 3 is a side elevation view of the fixture and contact of FIG. 1.

The contact can be rapidly installed in the slot by merely pressing the contact rearwardly, in the direction of arrow 86, through the slot, with sufficient force to deflect the plungers, until the contact rests against the slot bottom. Such pressing into the slot occurs with a stop 90 (FIG. 1) formed on a ferrule 91 of the contact, lying below a corresponding stop surface or stop 92 formed on the fixture at the bottom of the slot. The contact is then moved upwardly slightly, with the contact oriented so the cross-aperture 18 at the top of the contact lies in a predetermined orientation, such as with the axis 94 (FIG. 2) of the cross-aperture extending perpendicular to the center line 82 of the slot.

As shown in FIGS. 5 and 6, a key in the form of a pin 96 is fixed to the stop surface 92 at the bottom of the slot, and a corresponding key receiver or stop slot 98 is formed in the stop 90 to receive, or mate with, the pin 96. The key and receiver form angular orientation elements controlling the orientation of the contact. The pin 96 is received only at a particular orientation of the contact about its vertical axis 84. Accordingly, the contact can be raised to its final position only at the proper angular orientation about its vertical axis. This assures that the electrodes 20, 22 will be received in the cross-aperture as the contact is raised, and prevents damage to the electrodes or contact. The fact that the plungers include balls 70 that can easily rotate about all axes passing through their centers 72, results in low frictional resistance against the contact in pressing the contact across the plungers to the bottom of the slot, moving the contact vertically upwardly, and then rotating the contact about its vertical axis 84 until the key receiver 98 is aligned with the key 96. However, the plungers press the contact with a sufficient force against the slot bottom to reliably hold the contact in place. After a lens is formed on an optic fiber in the contact, the contact can be removed by merely pulling it out of the slot. During such pulling, the contact will rotate to allow the key receiver or recess 98 to pull out of the pin 96.

Applicant initially constructed a fixture of the type shown in the drawings, but with only two plungers. It was found that this allowed the contact to lie with its vertical axis slightly tilted from the vertical, and with only its top or bottom touching the bottom of the slot. Although a longer slot, with the plungers at the middle of the height of the slot, would avoid this, a shorter slot can be used by using two pairs of plungers spaced along the height of the slot, as shown in FIG. 1. It would also be possible to use only three plungers, with two on one side and one on the other side located halfway between the heights of the other two. Fixtures of the type shown in the figures have been found to work well, by enabling rapid installation of contacts, while assuring that they lie in a precise position and orientation, and the subsequent rapid removal of the contacts.

Thus, the invention provides an apparatus for forming a lens on the front end of an optical fiber, held in a contact, using a fixture that permits rapid installation of the contact at a precise position and orientation, and rapid removal of the contact. The fixture includes a frame with a vertical slot and with plungers at the sides of the slot for pressing the contact against the bottom of the slot. The bottom of the slot can be V-shaped to accurately locate the contact in two horizontal directions. The contact and fixture can include mating stops which limit upward movement of the contact, one stop forming a key and the other a key receiver, that assure proper angular orientation of the contact about its vertical axis prior to reaching its uppermost position. Plungers can be used, of the type which include balls that each can rotate about any axis passing through its center, to facilitate movement of the contact.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fixture for holding an elongated optical fiber connector contact so an optical fiber therein can be positioned with its forward end at a heating device that melts the fiber end into a lens comprising:

a frame which has a front and a vertical slot extending into said front, and which has a vertically extending slot bottom and slot sides, said frame having a pair of plunger holes including a hole extending into each side of the slot, said contact having a width which allows it to pass into said slot and lie closely within said slot;

a plunger sideably mounted at each plunger hole and having an outer end which can enter said slot;

means for biasing each plunger toward said slot;

said plunger holes located so when one side of the contact abuts the slot bottom, the plungers press against contact locations closer to a second side of the contact which is opposite said one side than to said one side.

2. The fixture described in claim 1 wherein:

said slot has an imaginary centerline lying halfway between said slot sides, and said slot bottom is substantially V-shaped with the sides of the V equally angled from said slot centerline, and said contact is of cylindrical shape.

3. The fixture described in claim 1 wherein:

said frame forms a stop below said slot sides; and including a contact which has a forward end and a stop spaced a predetermined distance rearward of said forward end, said contact being vertically slideable along said slot until its stop abuts the frame stop, said heating device located at a predetermined position above said slot and said heating device can effectively heat an optical fiber in said contact only when the front end of the contact lies said predetermined distance above said frame stop.

4. The fixture described in claim 3 wherein:

said heating device can efficiently heat a fiber on a contact only at a predetermined orientation of the contact about an axis passing along its length;

said frame and contact form a key and key receiver which mate to allow said stops to engage each other only at a predetermined angular orientation of the contact along said axis.

5. The fixture described in claim 1 wherein:

said frame has two plunger holes in at least one of said slot sides, and a plunger in each plunger hole and a means biasing each plunger toward said slot.

6. Apparatus for forming a lens on the front end of an optical fiber comprising:

an elongated largely cylindrical contact having a hole extending along its length which can receive an optical fiber, said contact having a forward end with a cross-aperture therein extending substantially perpendicular to said hole;

a fixture having a vertical slot for holding said contact;

a pair of electrodes having tips and means for holding said electrodes with their tips above said fixture at opposite sides of a location above said slot;

said fixture including a frame having a front and said slot extending into said front, said slot having opposite sides and a slot bottom, and said frame forming a frame stop substantially at a lower end of said slot, said fixture including a pair of plungers located at said opposite sides of said slot and springs urging said plungers towards each other, said plungers located a distance from said slot bottom to press said contact towards said slot bottom;

said contact having a contact stop spaced a distance rearward of said cross-aperture equal to the distance between said electrode tips and said frame stop;

said contact being insertable into said slot to deflect said plungers and rest against the slot bottom, and said contact being slideable along its length until said contact stop abuts said frame stop.

7. The apparatus described in claim 6 wherein:

said frame and contact each includes an angular orientation element, including a pin element having a pin and a hole element defining a hole, one element mounted on said frame and the other on said contact, said pin element abutting said hole element at a location around said hole and preventing abutting of said stops until said contact has an orientation at which said electrode tips lie at opposite sides of said cross-aperture.

8. The apparatus described in claim 6 wherein:

each of said plungers includes a ball, which can roll on said contact, as said contact is moved horizontally inwardly through said slot against said slot bottom, and which can roll on said contact as said contact is moved along its length until said stops abut.

9. The apparatus described in claim 6 wherein:

said slot is wider than said said contact diameter; and said innermost surface of said slot is substantially V-shaped.

* * * * *